United States Patent
Ueda et al.

(10) Patent No.: US 7,809,922 B2
(45) Date of Patent: Oct. 5, 2010

(54) TRANSLATION LOOKASIDE BUFFER SNOOPING WITHIN MEMORY COHERENT SYSTEM

(75) Inventors: Makoto Ueda, Kyoto (JP); Kenichi Tsuchiya, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 11/875,943

(22) Filed: Oct. 21, 2007

(65) Prior Publication Data

US 2009/0106502 A1 Apr. 23, 2009

(51) Int. Cl.
*G06F 12/00* (2006.01)

(52) U.S. Cl. ........................................ 711/207
(58) Field of Classification Search .............. None
See application file for complete search history.

(56) References Cited

U.S. PATENT DOCUMENTS

| | | | |
|---|---|---|---|
| 4,757,447 A * | 7/1988 | Woffinden | 711/207 |
| 6,256,715 B1 * | 7/2001 | Hansen | 711/163 |
| 6,633,967 B1 * | 10/2003 | Duncan | 711/207 |
| 2008/0320236 A1 | 12/2008 | Ueda et al. | |

* cited by examiner

*Primary Examiner*—Brian R Peugh
(74) *Attorney, Agent, or Firm*—Michael Dryja

(57) ABSTRACT

A node of a multiple-node system includes a translation lookaside buffer (TLB), a cache, and a TLB snoop mechanism. The node shares memory with other nodes of the multiple-node systems, and is connected with the other nodes via a bus. The TLB snooping mechanism snoops inbound memory access requests and/or outbound memory access requests. Inbound requests are received from over the bus and are intended for the cache. However, the cache receives only the inbound requests that relate to memory addresses having associated entries within the TLB. Outbound requests are received from within the node and are intended for transmission over the bus. However, the bus coherently transmits only the outbound requests that relate to memory addresses that are part of memory pages having set shared-memory page memory flags. All other outbound memory access requests are sent over the bus non-coherently.

20 Claims, 5 Drawing Sheets

TRANSLATION LOOKASIDE BUFFER SNOOPING WITHIN MEMORY COHERENT SYSTEM

FIELD OF THE INVENTION

The present invention relates generally to memory coherent, multiple-node systems, and more particularly to translation lookaside buffer (TLB) snooping within each node to improve memory coherency performance.

BACKGROUND OF THE INVENTION

Multiple-node computing systems are a common way to improve application execution performance. Each node typically includes one or more processors. Execution of an application may be distributed over the nodes of such a computing system. The computing system may include memory that is shared among all the nodes. For example, in a non-uniform memory architecture (NUMA) computing system, each node has local memory that is remote memory to all the other nodes.

Because the nodes may have caches that cache the contents of the memory of the computing system, for the computing system to operate properly, typically cache coherency, or consistency, has to be maintained. Cache coherency is the process by which it is ensured that the contents of memory that are cached by any given node accurately reflect what is stored in that memory. For example, a node may currently accurately cache the contents of a memory address as the value A. If another node writes the value B to that same memory address, the memory address as cached at the former node has to be invalidated, so that this node does not believe that the memory address currently stores the value A when in fact it currently stores the value B.

Memory coherency, however, can impact the performance of multiple-node computing systems. In particular, when a read-related memory access request is made at a node, the node has to ensure that if the memory address in question is currently cached, that the contents of the memory addressed as cached are valid. Likewise, when a write-related memory access request is made at a node, the computing system has to ensure that the memory address in question is invalidated at any other node that is currently caching the contents of this memory address. Thus, memory access requests as used herein encompass both read-related and write-related requests.

In particular, the so-called modified-exclusive-shared-invalidated (MESI) coherency protocol, which is also known as the Illinois protocol, can hamper the performance of a multiple-node computing system. Under the MESI coherency protocol, all read-related requests to a cached memory address that is marked invalid have to be broadcast to all the other nodes of the computing system. This performance penalty in particular has been the motivation for introducing directory-based coherency protocols in cache-coherent NUMA (CC-NUMA) computing systems in particular.

However, employing directory-based coherency protocols in multiple-node computing systems, while improving performance, requires additional hardware to be added to these computing systems, increasing their cost. As a result, directory-based CC-NUMA computing systems, for instance, are suitable only for commercial applications where hardware cost is not a significant constraint. For other applications, such as in embedded systems, the hardware cost involved with employing a directory-based coherency protocol can be prohibitive, meaning that in effect such embedded systems usually incur a performance penalty to maintain cache coherency.

For these and other reasons, there is a need for the present invention.

SUMMARY OF THE INVENTION

The present invention relates to translation lookaside buffer (TLB) snooping within a memory coherent system, such as a cache-coherent multiple-node computing systems. A method of one embodiment of the invention is performed at a node of such a system, and relates to processing inbound memory access requests. Such an inbound memory access request is received from over a bus that interconnects all the nodes together. The inbound memory access request has a system-wide memory address, such as the actual physical address of memory, as opposed to, for instance, a virtual memory address.

The method searches the TLB for the system-wide memory address. Only where the TLB has an entry associated with this address, and only where the cache associated with the TLB (i.e., the cache of the node of which the TLB is also a part) is enabled, and only where system-wide memory coherency is required, does the method performing the following. First, the cache is searched for the system-wide memory address. Only where the cache has an entry associated with the system-wide memory address does the method perform a cache operation related to the inbound memory access request.

In this way, this embodiment of the invention is advantageous over the prior art. In particular, the cache is relieved from handling all inbound memory access requests that are received from over the bus. That is, the cache handles only the inbound memory requests that relate to system-wide memory addresses having associated entries within the TLB—and only where the cache itself is enabled and system-wide memory coherency is required. Therefore, the cache can spend most of its time handling requests from the processor(s) of the node itself, as opposed to having to spend significant amounts of time handling inbound memory access request received from other nodes over the bus.

A method of another embodiment of the invention is also performed at a node of a multiple-node system, but relates to processing outbound memory access requests. Such an outbound memory access request is received from within the node itself. The outbound memory access request also has a system-wide memory address. However, this system-wide memory address may be a virtual memory address, or an actual physical address of memory, in this embodiment of the invention.

The method searches the TLB for the system-wide memory address, and searches the cache associated with the TLB (i.e., the cache of the node of which the TLB is also a part) for this address as well. Only where the TLB has an entry associated with the system-wide memory address, and only where the cache does not have an entry associated with the system-wide memory address, does the method performing the following, presuming again that the cache is enabled, and system-wide memory coherency is required. That is, the method performs the following only where the above four conditions are true.

In such instance, where a memory page encompassing the system-wide memory address has a shared-memory page flag set, the method coherently sends the outbound memory access request over the bus. The shared-memory page flag indicates whether the memory page encompassing one or more system-wide memory addresses—including the address of the outbound request in question—is shared by more than one node of the system. Where this memory page does not have its shared-memory page flag set, then the outbound memory access request is instead sent non-coherently over the bus.

In this way, this embodiment of the invention is advantageous over the prior art. In particular, those of ordinary skill within the art can appreciate that coherent transmissions of memory requests require more system resources than non-coherent transmissions of memory requests require. As such, by limiting coherent transmission to only those outbound memory access requests that relate to memory addresses that are part of memory pages having set shared-memory page flags—and only where the memory addresses are located in the TLB but not in the cache, and only where the cache is enable and memory coherency is required—performance is improved. Many outbound memory access requests, for instance, will be sent via non-coherent transmission.

A system of an embodiment of the invention includes a number of nodes that share memory, and that are interconnected with one another over a bus. Each node includes a TLB, a cache, and a TLB snoop mechanism. The TLB snoop mechanism can at least substantially perform the methods that have been described. In particular, the TLB snoop mechanism can snoop inbound memory access requests received from over the bus and intended for the cache such that the cache receives only the inbound memory access requests that relate to system-wide memory addresses having associated entries within the TLB. The TLB snoop mechanism can further snoop outbound memory access requests received from within the node and intended for transmission over the bus such that the bus transmits in a coherent manner only the outbound memory access requests that relate to system-wide memory addresses that are part of memory pages having shared-memory page flags that are set.

Embodiments of the invention thus provide for advantages over the prior art. Unlike the modified-exclusive-shared-invalidated (MESI) coherency protocol, embodiments of the invention maintain coherency without as significant a detriment to system performance. Unlike directory-based coherency protocols, embodiments of the invention can maintain coherency without requiring as costly additional hardware to be added to systems. As such, embodiments of the invention are suitable for deployment within embedded systems and other types of systems in which hardware cost can pose a significant constraint. Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
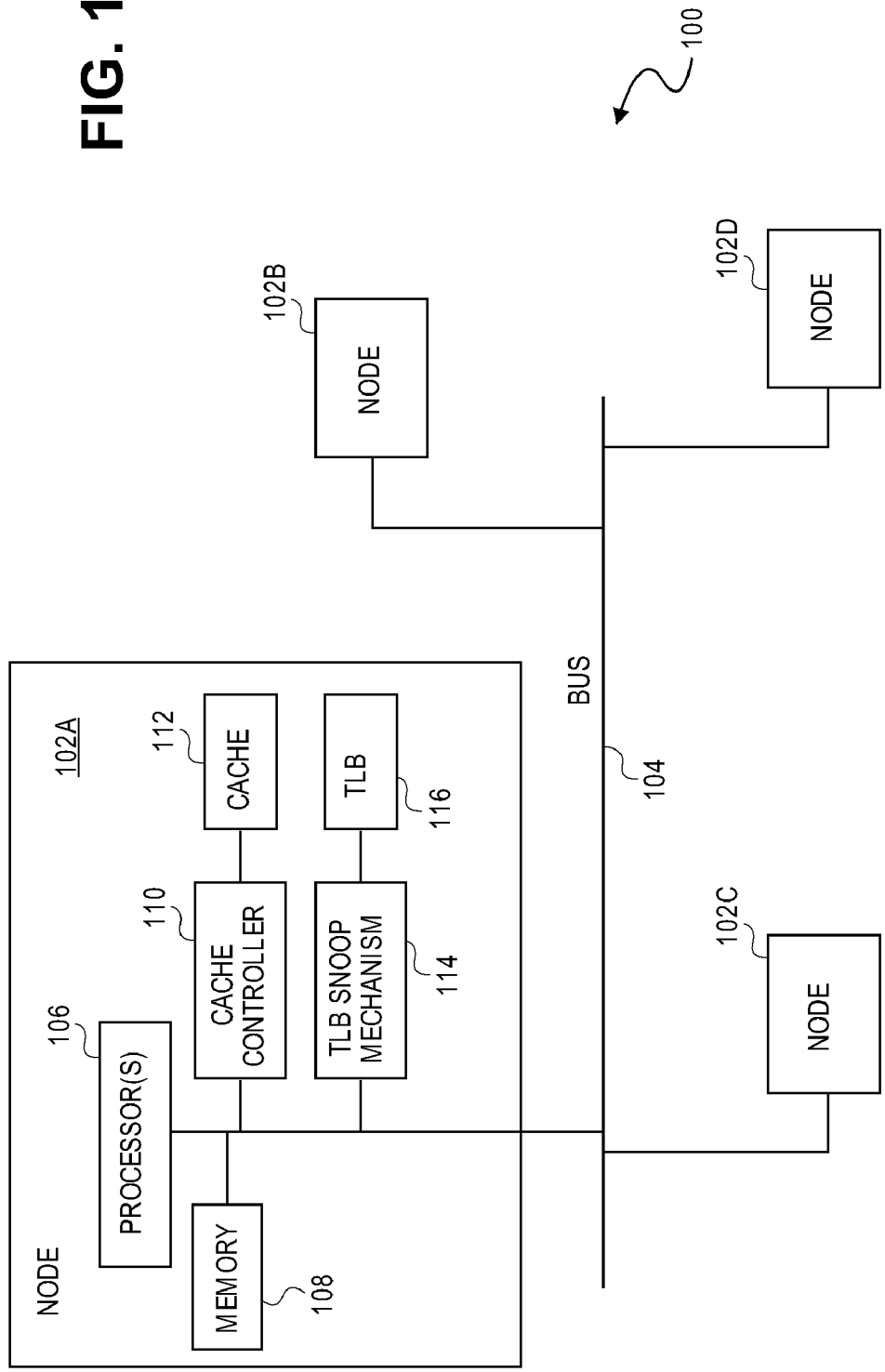
FIG. 1 is a diagram of a multiple-node computing system, according to an embodiment of the invention.

FIG. 1 shows a multiple-node computing system 100, according to an embodiment of the invention. The computing system 100 includes a number of nodes 102A, 102B, 102C, and 102D, collectively referred to as the nodes 102, and which are connected to one another over a bus 104. Four of the nodes 102 are depicted in FIG. 1, but in other embodiments, there may be more or less of the nodes 102. The bus 104 may be an interconnection network, or another type of network or bus.

The node 102A is depicted in detail in FIG. 1 as representative of all the nodes 102. Thus, each of the nodes 102 has the same components that are depicted only for the node 102A in FIG. 1. The node 102A is depicted as including one or more processors 106, physical memory 108, a cache controller 110, a cache 112, a translation lookaside buffer (TLB) snoop mechanism 114, and a TLB 116. The TLB snoop mechanism 114, as well as the cache controller 110, may be implemented in hardware. It is also noted that the mechanism 114 and the controller 110 are different, separate components, and are not integrated within the same component or mechanism. Those of ordinary skill within the art can appreciate that the node 102A may include other components, in addition to and/or in lieu of those depicted in FIG. 1.

The processors 106 receive inbound memory-related requests from the nodes 102 other than the node 102A for processing in relation to the physical memory 108, such as read-related requests and write-related requests. Likewise, the processors 106 generate outbound memory-related requests to be transmitted over the bus 104 for receipt by other nodes 102 for processing by the processors of these other nodes 102 in relation to their memories. The system 100 is a non-uniform memory architecture (NUMA) system, in which the physical memory 108 is local to the node 102A and is remote to the other nodes. However, in other embodiments, the system 100 may not be a NUMA system.

The cache controller 110 is implemented in hardware, and is responsible for the cache 112, which is also implemented in hardware. Thus, the cache controller 110 is responsible for caching memory addresses within the cache 112 so that the processors 106 can access the contents of these memory addresses without having to access the actual memory at which these memory addresses are stored. In this way, the cache 112 provides for performance benefits, as can be appreciated by those of ordinary skill within the art.

The TLB 116 is another type of cache that is used to improve the speed of virtual address translation, where such virtual address translation is described in more detail in relation to FIG. 2 below. The TLB 116 has a fixed number of slots containing page table entries, which map virtual addresses onto physical addresses. If a requested virtual address is present in the TLB 116, a match is yielded quickly, after which the physical address can be used to access the memory, either directly or as cached within a cache. If the requested virtual address is not in the TLB 116, the translation proceeds using a page table, which is slower to access, and which is also described in more detail in relation to FIG. 2 below.

The TLB snoop mechanism 114 snoops, or examines, inbound memory access requests received from over the bus 104 and intended for the cache 112, as well as outbound memory access requests received from within the node 102A and intended for transmission over the bus 104. As will be described in more detail below in relation to FIG. 3, the TLB snoop mechanism 114 snoops inbound memory access requests such that the cache 112 (i.e., through the cache controller 110) receives only those inbound memory access requests that relate to memory addresses having associated entries within the TLB 116. As will be described in more detail below in relation to FIG. 4, the TLB snoop mechanism 114 snoops outbound memory access requests such that the bus 104 transmits in a coherent manner only those outbound requests that relate to memory addresses that are part of memory pages having set shared-memory page flags. All other outbound memory access requests are sent in a non-coherent manner.

Figure 2:
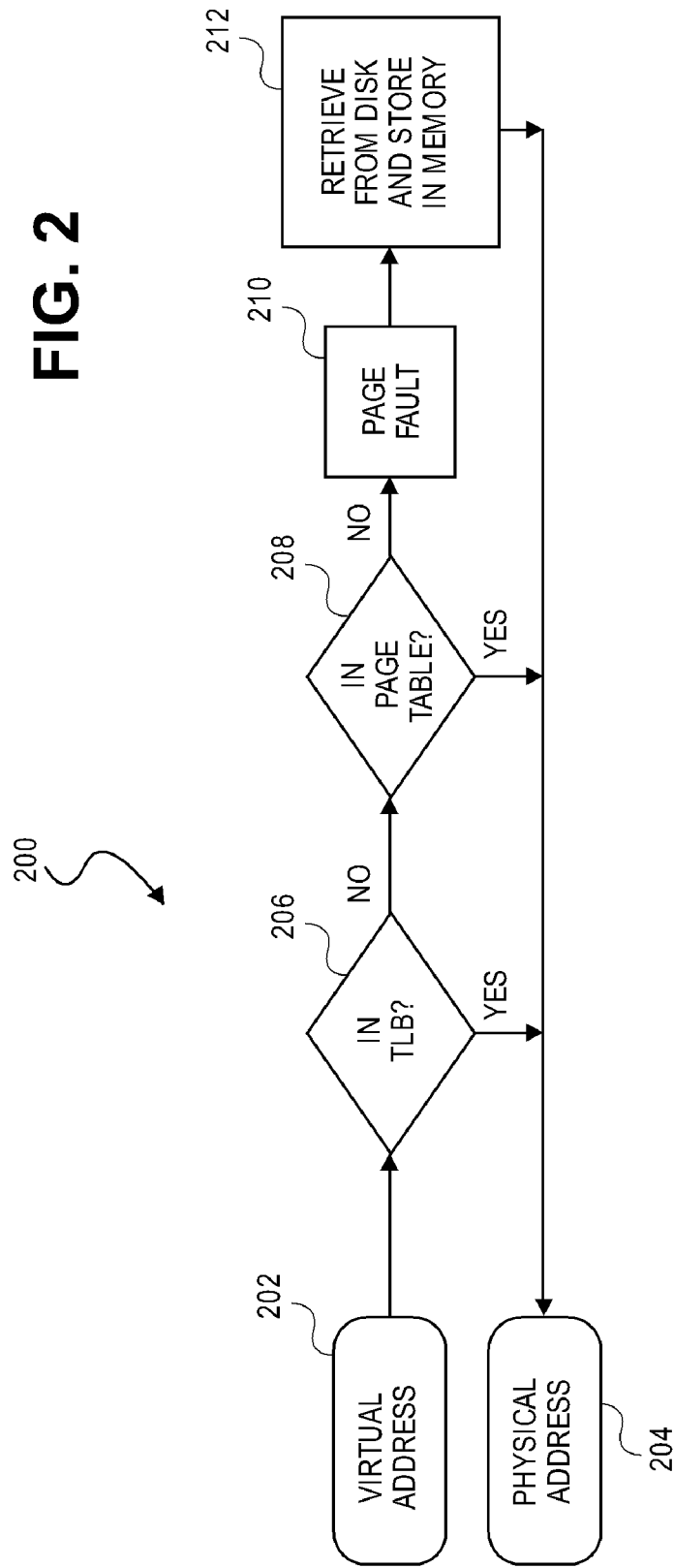
FIG. 2 is a flowchart depicting a process by which virtual memory addresses can be translated to physical memory addresses, according to an embodiment of the invention.

FIG. 2 shows a process 200 by which a virtual address 202 is translated into a physical address 204, according to an embodiment of the invention. The process 200 can be augmented as is described in relation to FIG. 5 below. In general, there can be more virtual memory addresses within the system 100 than physical memory addresses within the physical memories of the nodes 102. For example, the system 100 may allow computer programs to use up to four gigabytes of memory, while there may actually be just one or two gigabytes of physical memory within the system 100.

Therefore, as can be appreciated by those of ordinary skill within the art, the system 100 maps virtual memory addresses to physical memory addresses, within a memory page table. If a requested virtual memory address is not currently mapped to a physical memory address—which can occur, because there are more virtual addresses than physical addresses—then the following can occur. First, the contents of one of the virtual memory addresses that is currently mapped to a physical memory address can be temporarily stored on a slower storage device, such as a hard disk drive typically. Thereafter, the contents of the requested virtual memory address can be moved from the hard disk drive (or other storage device) to this physical memory address, and the requested virtual memory address mapped to this physical memory address.

In actuality, switching out virtual memory to and from physical memory is achieved on a memory page basis, not on a memory address basis as described in the previous paragraph. A memory page encompasses a block of memory addresses. Switching virtual memory to and from physical memory on a memory page basis is usually achieved for performance reasons.

Therefore, the process 200 operates as follows. A virtual memory address 202 is received for which a corresponding physical memory address 204 is required. If the virtual memory address 202 is mapped to a physical memory address 204 within the TLB of the node in question (206), then the physical memory address 204 is easily retrieved from the TLB, and the process 200 is finished. Otherwise, if the virtual memory address 202 is mapped to a physical memory address 204 within the memory page table (208)—where the page table may be maintained on a per-system basis as opposed to a per-node basis—then the physical memory address 204 is retrieved from the page table, and the process 200 is finished. Accessing the page table is slower than accessing the TLB, however. Therefore, if a memory page encompassing a requested virtual address is within the page table but not within the TLB, then the address translation will thereafter be added to the TLB.

However, if the virtual memory address 202 is not mapped to a physical memory address 204 within the memory page table, then what is referred to as a page fault occurs (210). The memory page table tracks all the virtual memory pages that are currently mapped to physical memory pages. If the requested virtual memory address 202 is not found within the page table (i.e., its virtual memory page is not mapped to a physical memory page in the table), then this means that the virtual memory page of which the virtual memory address 202 is a part is not currently in physical memory, resulting in the page fault. In this instance, then, the contents of the virtual memory page in question are retrieved from disk (or another storage device) and stored in physical memory (212). As such, the physical memory address 204 corresponding to the virtual memory address 202 can be provided. The mapping of the virtual memory page to the physical memory page is stored in the page table and also added to the TLB in a similar manner as storing into the page table.

As has been noted above, the process 200 that has been described is augmented as will be described in relation to FIG. 5 below so that the TLB snoop mechanism 114 is properly able to snoop outbound memory-related requests. In particular, for each memory page stored in the memory page table, a state of the memory page is maintained. The state of the memory page is maintained as being not-in-TLB, exclusive, or shared. The not-in-TLB state indicates that the memory page is not referenced by the TLB of any node. The exclusive state indicates that the memory page is referenced by the TLB of just one node. The shared state indicates that the memory page is referenced by the TLB's of two or more nodes.

It is noted that the TLB's of the nodes themselves are also augmented so that the TLB snoop mechanism 114 is properly able to snoop outbound memory-related requests. In particular, for each memory page referenced in a TLB of a node, there is a shared-memory page flag. This flag is set when the memory page in question is referenced within the TLB's of two or more nodes. This flag is cleared when the memory page in question is referenced just by the TLB of one node. The flag may be a single bit, for instance. Thus, as an example, if the TLB of just one node references a particular memory page, the shared-memory page flag is cleared at this TLB. By comparison, if the TLB's of two or more nodes reference a particular memory page, the shared-memory page flag is set at each TLB in question.

Figure 3:
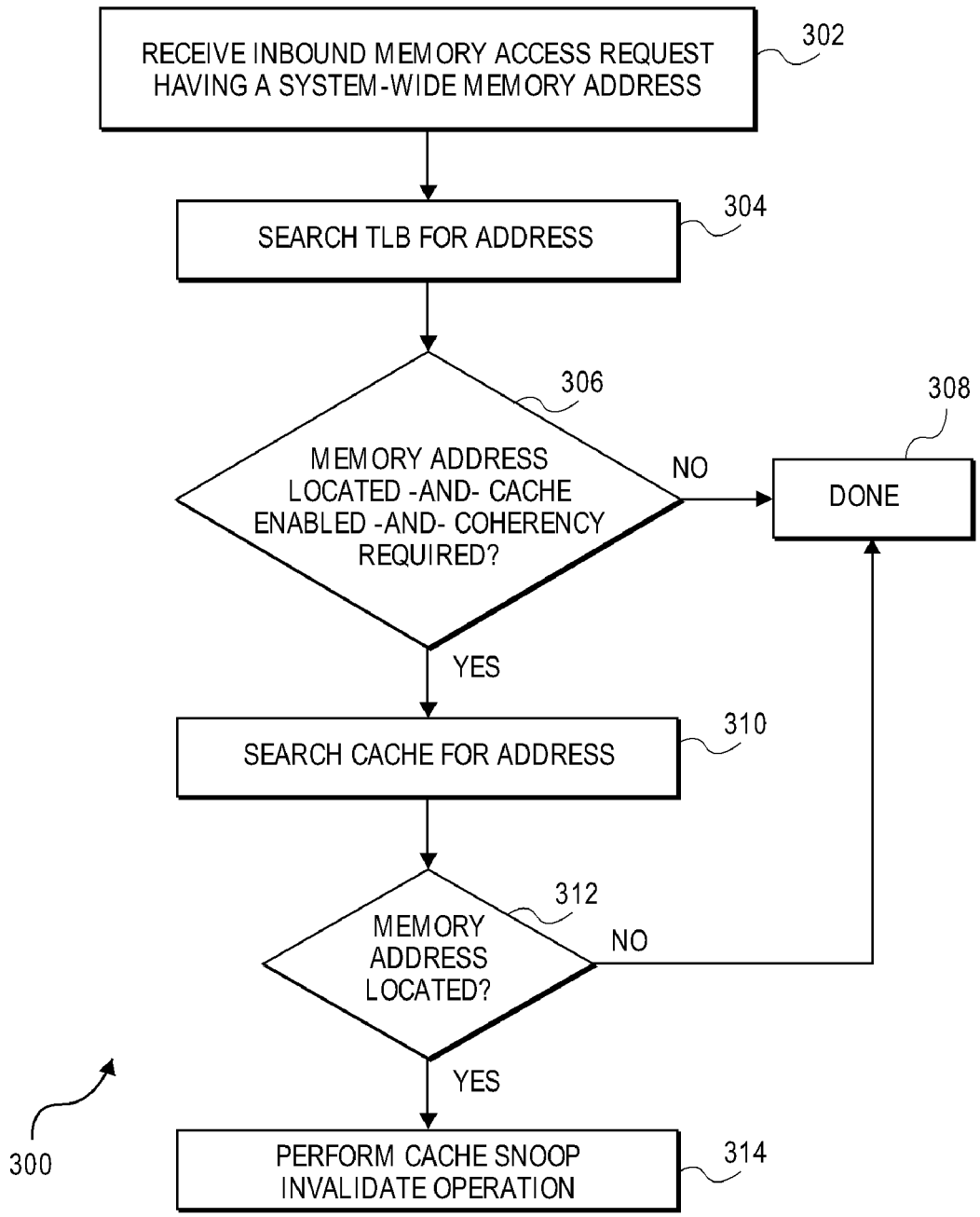
FIG. 3 is a flowchart of a method for handling inbound memory-related access requests for coherency, according to an embodiment of the invention.

FIG. 3 shows a method 300 for snooping inbound memory-related requests, according to an embodiment of the invention. The method 300 is described in relation to the node 102A of the system 100 of FIG. 1. The node 102A receives an inbound memory access request (302). The request is received from over the bus 104. The request relates to a system-wide memory address. That is, the memory address in question is a system address for all the nodes 102, as opposed to being a memory address that is just a local address related to just the node 102A. In one embodiment, the system-wide memory address in the method 300 of FIG. 3 is a physical memory address, as opposed to, for instance, a virtual memory address.

The TLB snoop mechanism 114 searches the TLB 116 for the memory address (304). That is, the mechanism 114 searches the TLB 116 for an entry associated with the address, such as an entry corresponding to a memory page that encompasses the address. If the memory address is not located in the TLB 116, OR the cache 112 is not enabled, OR system-wide memory coherency is not required (306), then the method 300 ends (308), such that the inbound memory access request may be handled without involving the cache 112 or the cache controller 110. That is, the method 300 proceeds from part 306 to part 310 only where the memory address is located in the TLB 116, AND the cache 112 is enabled, AND system-wide memory coherency is required.

In such instance, the cache controller 110 searches the cache 112 for the memory address (310). (Thus, the memory access request is transmitted to the cache controller 110 so that the controller 110 can search the cache 112.) That is, the controller 110 searches the cache 112 for an entry associated with the address, such as an entry corresponding to a memory page that encompasses the address, or an entry corresponding particularly to the address in question. If the memory address is not located in the cache 112 (312), then the method 300 terminates the snoop operation (308), such that the inbound memory request may be handled without further involvement of the cache 112 or the cache controller 110. Only if the memory address is located in the cache does the cache controller 110 perform a cache-related snoop operation in relation to the memory address in question (314).

Thus, the method 300 improves cache performance in a cache coherent system by minimizing the number of memory access requests that are handled by the cache controller 110 and the cache 112. If the memory address in question is not located in the TLB 116, or the cache 112 is not enabled, or cache coherency is not required, then the cache controller 110 and the cache 112 do not process the memory access request at all. As such, the cache 112, as well as the cache controller 110, are relieved from handling all inbound memory access requests received over the bus 104 by the node 102A, and only handle those requests that relate to memory addresses having associated entries within the TLB 116, assuming the other conditions of part 306 also hold.

Figure 4:
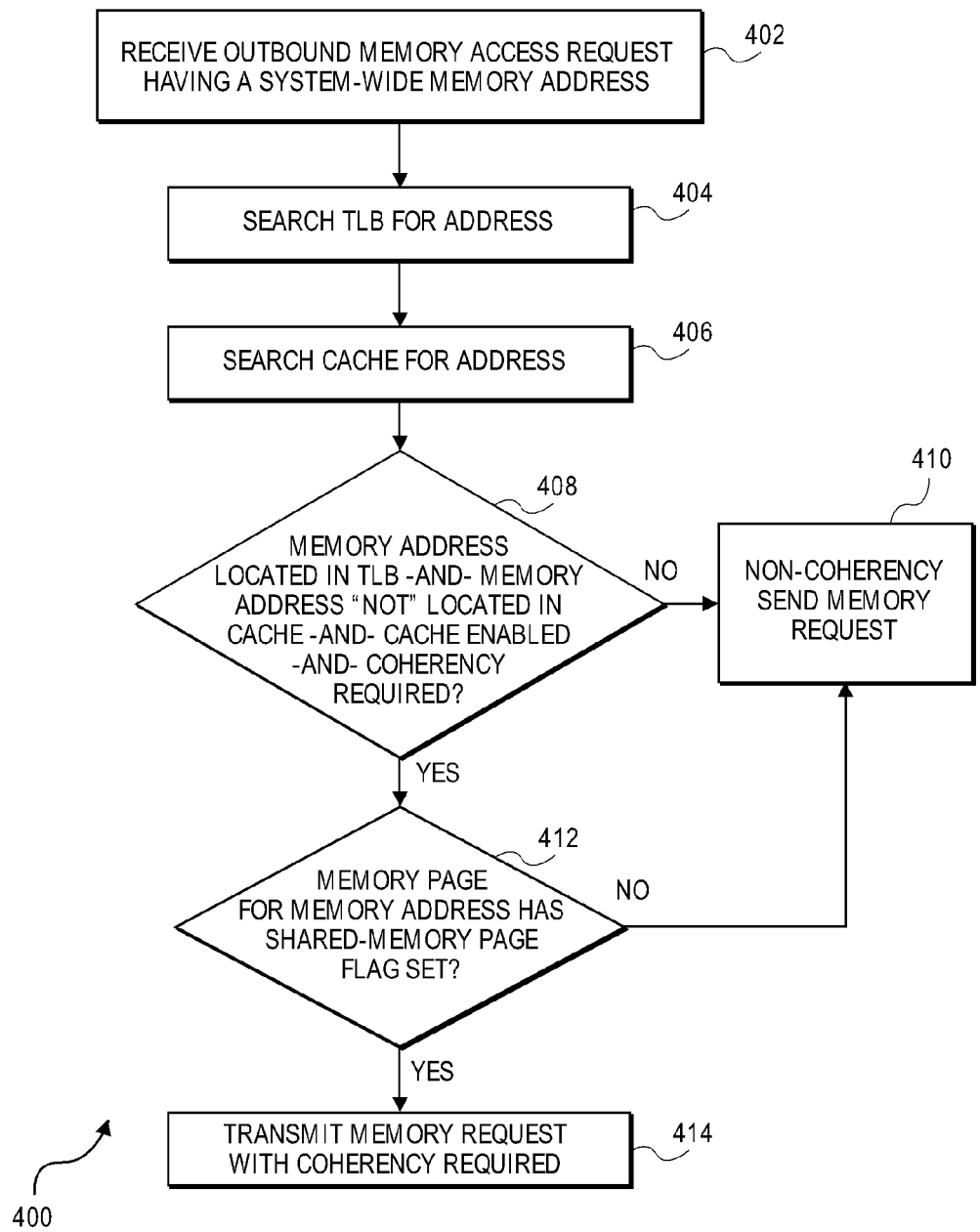
FIG. 4 is a flowchart of a method for handling outbound memory-related access requests for coherency, according to an embodiment of the invention.

FIG. 4 shows a method 400 for snooping outbound memory-related requests, according to an embodiment of the invention. The method 400 is described in relation to the node 102A of the system 100 of FIG. 1. In one embodiment, the TLB snoop mechanism 114 is said to perform all parts of the method 400, except part 406, which is instead performed by the cache controller 110.

The node 102 is said to receive an outbound memory access request from within the node 102 (402). In particular, the outbound memory access request is generated from within the node 102A, such as by one of the processors 106, and is output onto the portion of the bus 104 within the node 102A, where it can be said to be received by other components of the node 102A, such as the TLB snoop mechanism 114, for instance. The request relates to a system-wide memory address, and may be a physical memory address in one embodiment.

The TLB snoop mechanism 114 searches the TLB 116 for the memory address (404), while the cache controller 110 searches the cache 112 for the memory address (406). That is, the mechanism 114 searches the TLB 116 for an entry associated with the address, such as an entry corresponding to a memory page that encompasses the address. Similarly, the controller 110 searches the cache 112 for an entry associated with the address, such as an entry corresponding to a memory page encompassing the address, or an entry corresponding particularly to the address in question.

If the memory address is not located in the TLB 116, OR the memory address is located in the cache 112, OR the cache 112 is not enabled, OR system-wide memory coherency is not required (408), then the memory request is sent in a non-coherent manner over the bus 104 (410). For example, the memory request may be sent to just the node for which the memory to which the memory request relates is local. That is, no communications have to be sent to all the other nodes, because the memory request with non-coherency is sent. By comparison, sending a memory request with coherency required over the bus 104 requires that communications be sent to more than one other node, because these other nodes have to update their caches, for instance, in correspondence with the memory request. Such a coherent manner of sending a memory request is more expensive performance-wise than a non-coherent manner of sending a memory request.

In general, the coherent manner of sending a memory request may be considered a first type of memory request transmission, whereas the non-coherent manner of sending a memory request may be considered a second type of memory request transmission. In the coherent manner, the memory request with coherency is sent concurrently to more than one other node, so that all these other nodes can appropriately update their memories and/or their caches based on the memory request. By comparison, in the non-coherent manner, the memory request with non-coherency is sent, to typically just one node. As such, performance improves over the bus 104.

The method 400 proceeds from part 408 to part 410 only where the memory address is located in the TLB 116, AND the memory address is not located in the cache 112, AND the cache 112 is enabled, AND system-wide memory coherency is required. In this instance, only if the memory page for the memory address (i.e., the memory page encompassing a block of addresses including the memory address in question) has a shared-memory page flag set (412), does the method 400 coherently (i.e., in a coherent manner) send the memory request over the bus 104 (414), as has been described. If the memory page for the memory address does not have its shared-memory page flag set, then the method 400 instead sends the memory request with non-coherency over the bus 104 (410), as has also been described.

Thus, as has been described above, each memory page has a shared-memory page flag. The flag is set when more than one node is currently caching—i.e., sharing—any address (es) encompassed by this page, and is cleared, or not set, otherwise. Therefore, in the method 400, the only time a memory request is sent in a coherent manner onto the bus 104 is: (1) if the address is located in the TLB 116; AND (2) if the address is not located in the cache 112; AND (3) the cache 112 is enabled; AND (4) coherency is required; AND (5) the shared-memory page flag for the page encompassing the address is set. Otherwise, the memory request is sent in a non-coherent manner.

The method 400 therefore improves coherency performance by minimizing the number of times memory requests have to be sent in a coherent manner, which are generally more expensive performance-wise than sending memory requests in a non-coherent manner. As such, traffic on the bus 104 is minimized. Overall performance of the nodes 102 is also improved, because concurrency does not have to be achieved with non-coherent memory request transmissions, in contradistinction to coherent memory request transmissions.

Figure 5:
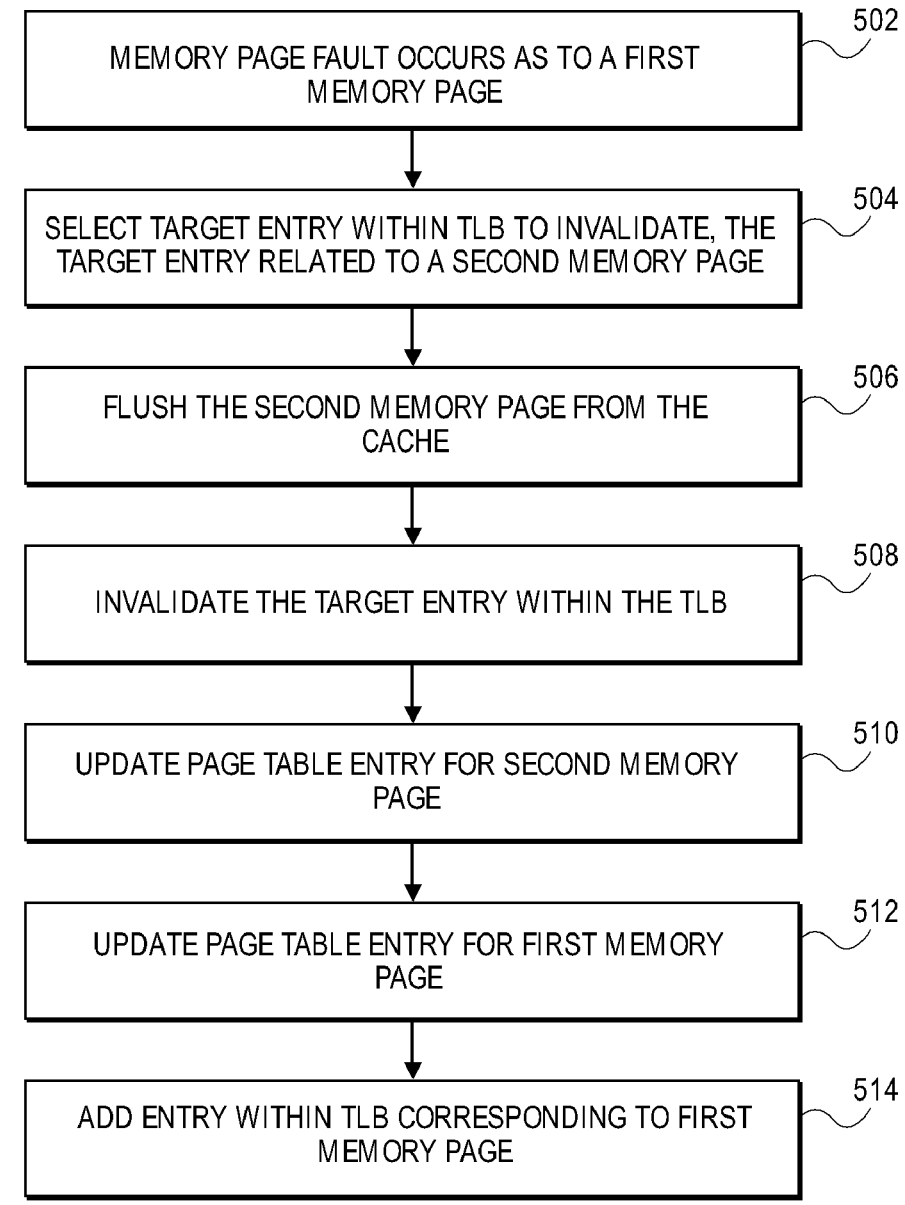
FIG. 5 is a flowchart of a method for handling memory page faults, according to an embodiment of the invention.

FIG. 5 shows a method 500 for handling memory page faults, according to an embodiment of the invention. In particular, the method 500 ensures that the shared-memory page flags are properly set and cleared within the memory page table. This in turn ensures that the method 400 can work. However, those of ordinary skill within the art can appreciate that while the method 500 may be considered as a part of the method 400 in one embodiment, in other embodiments the shared-memory page flags may be maintained so that the method 400 can work in a way other than as is now described in relation to the method 500. As with the methods 300 and 400, the method 500 is particularly described in relation to the node 102A of the system 100 of FIG. 1.

Thus, a memory page fault occurs in relation to a first memory page (502). This means that a memory address of the first memory page has been requested, but the first memory page is not currently loaded into physical memory. Therefore, what is referred to as a target entry within the TLB 116 is selected for invalidation (504), where this target entry particularly relates to a second memory page. The target entry may be selected as being the entry for the (second) memory page encompassing memory addresses that have not been accessed recently. The target entry may be selected in another manner as well, such as the entry for the (second) memory page encompassing memory addresses that are accessed least frequently.

Once this target entry has been selected, the second memory page is flushed from the cache 112 (506), to make room for the first memory page within the cache 116. Likewise, the target entry is invalidated within the TLB 116 (508), to also make room for the second memory page within the TLB 116. Thus, in one embodiment, the motivation in part 504 of the method 500 is to select an entry that relates to a (second) memory page that is most acceptable or amenable to being removed from physical memory from a performance perspective, such that system performance is least affected.

Thereafter, the page table entry within the memory page table for the second memory page is updated (510). In particular, if the second memory page is no longer cached by any node, then the state for this second memory page within the page table is set to "not-in-TLB," indicating that the second memory page is not referenced within the TLB of any node. This situation corresponds to where the node 102A was the only node caching the second memory page. Since the node 102A is not caching the second memory page any longer, then this means that no other node is caching the second memory page, either. The shared-memory page flag in this situation does not have to be adjusted, since if the node 102A was the only node previously caching this page, then the flag has already been cleared.

However, if the second memory page is now being cached by just one node (i.e., other than the node 102A, which is no longer caching this page), then the state for this second memory page within the page table is set to "exclusive," indicating that the second memory page is referenced within the TLB of just one node. Furthermore, the shared-memory page flag is cleared. This situation corresponds to where two nodes, including the node 102A, were caching the second memory page, but because the node 102A is no longer caching the page, then this means that just one node is now caching the page. Therefore, the second memory page is no longer shared.

It is noted if the second memory page had been shared by three or more nodes, including the node 102A, no updating of the state for this second memory page within the page table, or of the shared-memory page flag for this page, has to be performed. This is because even though the node 102A is no longer caching the second memory page, at least two other nodes are still caching the second memory page. As such, the state for this page remains the same—"shared"—and the shared-memory page flag for this page remains set.

The page table entry within the memory page table for the first memory page is also updated. In particular, if the first memory page was being cached by just one other node, then the state for this page within the page table is set from "exclusive" to "shared," and the shared-memory page flag is set for this page. This situation thus corresponds to the case where only one other node had been caching the first memory page, but now both this one other node as well as the node 102A are caching the first memory page. Therefore, while before the first memory page was exclusively cached, it is now cached in a shared manner, and whereas before the shared-memory page flag was cleared, it is now set.

However, if the first memory page was not being cached by any node, then the state for this page within the page table is set from "not-in-TLB" to "exclusive." This is because no other node had been caching the first memory page, but now only the node 102A is caching this page. Therefore, the node 102A is exclusively caching this page. However, the shared-memory page flag does not have to be adjusted in this situation, because going from zero nodes caching the page to one node caching the page does not alter the fact that the page is not being shared by more than one.

It is noted that if the first memory page had been shared by two or more nodes, no updating of the state for this first memory page within the page table, or of the shared-memory page flag for this page, has to be performed. This is because even though the node 102A is caching the first memory page—in addition to the two or more other nodes—the shared nature of such caching does not change. The state for this page remains the same—"shared"—and the shared-memory flag for this page remains set.

The method 500 concludes by adding an entry corresponding to the first memory page within the TLB 116 (514), and also at least in one embodiment by caching the first memory page (or one or more memory addresses thereof) within the cache 112. It is noted that the page fault handling can be accomplished in at least some embodiments in software, such as by a component of an operating system running on the system 100. As such, parts 502-512, and potentially part 514 as well, are performed in software. As has been noted, however, the modified page fault handling of the method 500 is performed so that the shared-memory page flag is properly set or cleared, so that the method 400 can be performed on the basis of this flag.

It is further noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method performed at a node of a system having a plurality of nodes interconnected with one another over a bus, the method comprising:

receiving an inbound memory access request from over the bus, the inbound memory access request having a system-wide memory address;

searching a translation lookaside buffer (TLB) for the system-wide memory address;

where the TLB has an entry associated with the system-wide memory address, and where a cache associated with the TLB is enabled, and where system-wide memory coherency is required, searching the cache for the system-wide memory address;

where the cache has an entry associated with the system-wide memory address, performing a cache operation related to the inbound memory access request.

2. The method of claim 1, wherein the cache is searched for the system-wide memory address only where the TLB has an entry associated with the system-wide memory address, and only where the cache associated with the TLB is enabled, and only where system-wide memory coherency is required.

3. The method of claim 1, wherein the cache is relieved from handling all inbound memory access requests received from over the bus, such that the cache handles only the inbound memory access requests that relate to system-wide memory addresses having associated entries within the TLB.

4. The method of claim 1, wherein a TLB snoop mechanism of the node at which the method is performed searches the TLB for the system-wide memory address.

5. The method of claim 4, wherein the TLB snoop mechanism is a different component of the node as compared to a cache controller of the node, the cache controller associated with the cache of the node.

6. The method of claim 4, wherein the TLB snoop mechanism is implemented completely in hardware.

7. The method of claim 1, further comprising, where the TLB has an entry associated with the system-wide memory address, where the cache associated with the TLB is enabled, and where system-wide memory coherency is required, transmitting the inbound memory access request to a cache controller of the node at which the method is performed.

8. The method of claim 7, wherein the cache controller searches the cache for the system-wide memory address, and the cache controller performs the cache operation where the cache has an entry associated with the system-wide memory address.

9. A method performed at a node of a system having a plurality of nodes interconnected with one another over a bus, the method comprising:

receiving an outbound memory access request from within the node, the outbound memory access request having a system-wide memory address;

searching a translation lookaside buffer (TLB) for the system-wide memory address;

searching a cache associated with the TLB for the system-wide memory address;

where the TLB has an entry associated with the system-wide memory address and where the cache does not have an entry associated with the system-wide memory address, where the cache is enabled, and where system-wide memory coherency is required, where a memory page encompassing the system-wide memory address has a shared-memory page flag set, the shared-memory page flag indicating whether the memory page encompasses one or more system-wide memory addresses including the system-wide memory address of the outbound memory access request is shared by more than one node of the system, coherently sending the outbound memory access request over the bus; and, where the memory page encompassing the system-wide memory address does not have the shared-memory page flag set, non-coherently sending the outbound memory access request over the bus.

10. The method of claim 9, wherein the outbound memory access request is coherently sent over the bus only where the TLB has an entry associated with the system-wide memory address, and only where the cache does not have an entry associated with the system-wide memory address, and only where the cache is enabled, and only where system-wide memory coherency is required, and only where the memory page encompassing the system-wide memory address has a shared-memory page flag set.

11. The method of claim 9, wherein the bus is relieved from transmitting all outbound memory access requests in a coherent manner, such that the bus transmits in the coherent manner only the outbound memory requests that relate to system-wide memory addresses that are part of memory pages having shared-memory page flags that are set.

12. The method of claim 9, wherein a TLB snoop mechanism of the node at which the method is performed performs all parts of the method except for searching the cache associated with the TLB.

13. The method of claim 12, wherein the TLB snoop mechanism is a different component of the node as compared to a cache controller of the node, the cache controller associated with the cache of the node.

14. The method of claim 12, wherein the TLB snoop mechanism is implemented completely in hardware.

15. The method of claim 9, further comprising, where the TLB has an entry associated with the system-wide memory address and where the cache does not have an entry associated with the system-wide memory address, where the cache is not enabled, non-coherently sending the outbound memory access request over the bus.

16. The method of claim 9, further comprising, where the TLB has an entry associated with the system-wide memory address and where the cache does not have an entry associated with the system-wide memory address, where system-wide memory coherency is not required, non-coherently sending the outbound memory access request over the bus.

17. The method of claim 16, wherein updating the page table entry for the second particular memory page comprises:

where the second particular memory page is no longer cached by any node, setting a state for the page table entry for the second particular memory page to not-in-TLB; and, where the second particular memory page is now cached by just one node, setting the state for the page table entry for the second particular memory page to exclusive, and clearing a shared-memory page flag for the second particular memory page at the one node.

18. The method of claim 16, wherein updating the page table entry for the first particular memory page comprises:

where a state for the page table entry for the first particular memory page is currently set to exclusive, setting the state to shared, and setting a shared-memory page flag for the first particular memory page at a node caching the first particular memory page; and, where a state for the page entry table for the first particular memory page is currently set to not-in-TLB, setting the state for the page table entry for the first particular memory page to exclusive.

19. The method of claim 9, further comprising, in response to a memory page fault related to a first particular memory page occurring:

selecting a target entry within the TLB to invalidate;

flushing a second particular memory page from the cache, the second particular memory page encompassing a system-wide memory address associated with the target entry within the TLB;

invalidating the target entry within the TLB;

updating a page table entry for the second particular memory page;

updating a page table entry for the first particular memory page; and, adding an entry within the TLB corresponding to the page table entry for the first particular memory page.

20. A system comprising:

a plurality of nodes sharing memory and interconnected with one another over a bus, each node comprising:

a translation lookaside buffer (TLB);

a cache; and, a TLB snoop mechanism to:

snoop inbound memory access requests received from over the bus and intended for the cache such that the cache receives only the inbound memory access requests that relate to system-wide memory addresses having associated entries within the TLB; and, snoop outbound memory access requests received from within the node and intended for transmission over the bus such that the bus transmits in a coherent manner only the outbound memory access requests that relate to system-wide memory addresses that are part of memory pages having shared-memory page flags that are set.

* * * * *